United States Patent [19]
Hess et al.

[11] Patent Number: 5,636,794
[45] Date of Patent: Jun. 10, 1997

[54] IN-LINE CHECK VALVE

[75] Inventors: Richard W. Hess, Ellicott City; Thomas G. Marsden, Rockville, both of Md.

[73] Assignee: Bowles Fluidics Corporation, Columbia, Md.

[21] Appl. No.: 420,829

[22] Filed: Apr. 12, 1995

[51] Int. Cl.$^6$ ........................................ B05B 1/10
[52] U.S. Cl. ..................... 239/284.1; 239/571; 137/539; 137/540
[58] Field of Search ............... 239/284.1, 571; 137/539, 540, 543.17

[56] References Cited

U.S. PATENT DOCUMENTS

| | | | |
|---|---|---|---|
| 4,590,962 | 5/1986 | Tespa | 137/593 X |
| 5,183,075 | 2/1993 | Stein | 137/539 X |

FOREIGN PATENT DOCUMENTS

| | | | |
|---|---|---|---|
| 63372 | 9/1955 | France | 239/284.1 |
| 924557 | 4/1963 | United Kingdom | 239/284.1 |

*Primary Examiner*—Andres Kashnikow
*Assistant Examiner*—Lesley D. Morris
*Attorney, Agent, or Firm*—Jim Zegeer, Esq.

[57] ABSTRACT

A windshield washer system has a nozzle mounted on a vehicle for issuing wash fluid to a windshield and a check valve for a fluid circuit from a supply of wash fluid to the nozzle. The nozzle has a fluid feed tube integrally formed therewith with annular walls defining a washer fluid flow path and a diameter of at least D. The feed tube has an external surface adapted to receive and retain a flexible hose from a supply of wash fluid. A spring shoulder receives a coil compression spring having upstream and downstream ends with the downstream end bearing on the spring shoulder. A valve element bears on the upstream end of the spring element, and a tubular insert having an inner end and an external diameter at least D and sufficient to form an elongated wash fluid seal with the annular walls defining a washer fluid flow path, and complementary-shaped valve seat formed on the inner end.

6 Claims, 3 Drawing Sheets

IN-LINE CHECK VALVE

BACKGROUND AND BRIEF DESCRIPTION OF THE INVENTION

The invention relates to an integral in-line check valve and, more specifically, to a windshield/glass washer nozzle having an integral check valve. Check valves are included in windshield/glass washer fluid feed lines to eliminate "drool" due to dynamic vehicle loads and when the hood is lifted. They also provide instantaneous response, that is, there is no delay from the fluid from the pump activation to fluid spray. Moreover, they provide a crisp start-up/shut-off and thereby reduce the amount of fluid that land on the surfaces.

In the prior art shown in FIG. 1, check valves are constituted by a two-piece nozzle housing to allow assembly of the check valve either by welding or gluing the check valve assembly onto the nozzle assembly.

According to the present invention, a one-piece housing and feed tube insert with valve seat eliminates a potential leakage due to incomplete welds or seal failure. According to the invention, an integral check valve is comprised of a coil spring, a valve element, and an insert or sleeve having a valve seat formed thereon, which is retained in the nozzle feed tube, preferably by a press fit. Thus, when the flexible tube or hose from the pump is slid over the feed tube and its retention barb, there is no possibility of leakage at the joint since the joint between the insert or sleeve is encompassed by the flexible feed tube. The present invention eliminates several parts thereby reducing the system cost and increasing reliability. Moreover, the check valve performance can be matched to needs of a particular nozzle such as a fluidic nozzle and the compact design allows the check valve to be incorporated with no increase in nozzle size.

The check valve of the present invention has a threshold or cracking pressure such that below this pressure no fluid will flow through the nozzle. Moreover, the check valve of the present invention will prevent air from entering the system through the nozzle which thereby will prevent fluid from draining back into the reservoir. This permits a faster response time since the response time is not slowed-up due to the feed tubes draining back into the reservoir after the system has been actuated. The feed tubes in the present invention will remain "primed" and the response will be nearly instantaneous. Finally, the relatively high cracking pressure and sealing ball provide a "crisp start-up and shut-off. Drops that land on surfaces other than the glass have been significantly reduced when compared to a standard fluidic nozzle.

According to the invention, the windshield washer system has a nozzle mounted on the vehicle for issuing wash fluid to the windshield and a check valve for a fluid circuit from a supply of wash fluid to the nozzle. The nozzle has a feed tube integrally formed therewith and the feed tube has annular walls defining a washer fluid flow path and a diameter of at least D. An internally formed spring shoulder and a coil spring having an upstream end and a downstream end with the downstream end bearing on the spring shoulder and a valve element, preferably a stainless steel ball, bears on the upstream end of the spring. A tubular insert has an inner end and an external diameter at least equal to the diameter D and sufficient to form an elongated wash fluid seal with the annular walls defining the wash fluid flow path and a ball valve seat is formed on the inner end of the tubular insert. Thus, when the flexible tube from the wash fluid supply is telescoped or fitted over the nozzle feed tube, the joint formed between the insert and the interior annular walls of the feed tube is totally within the tube so that any leakage at this point is directly back into the wash fluid supply thereby eliminating the potential leakage encompassed in prior art systems.

The present invention provides an easily assembled unit and is readily adaptable to the many different nozzle designs. A preferred cracking pressure is approximately 3 psi and this provides sufficient drooling resistance as well as a good start-up/shut-off characteristic. The flow rate test at 9 psi indicates less than 5% flow reduction when compared to the standard nozzle (i.e. one without a check valve). Standard cold temperature test results were not affected by the presence of the integral check valve.

BRIEF DESCRIPTION OF THE DRAWINGS

The above and other objects, advantages and features of the invention will become more apparent when considered with the following specification and accompanying drawings wherein.

FIG. I is a sectional view of a fluidic nozzle incorporating a prior art check valve.

DETAILED DESCRIPTION OF THE INVENTION

Figure 1:
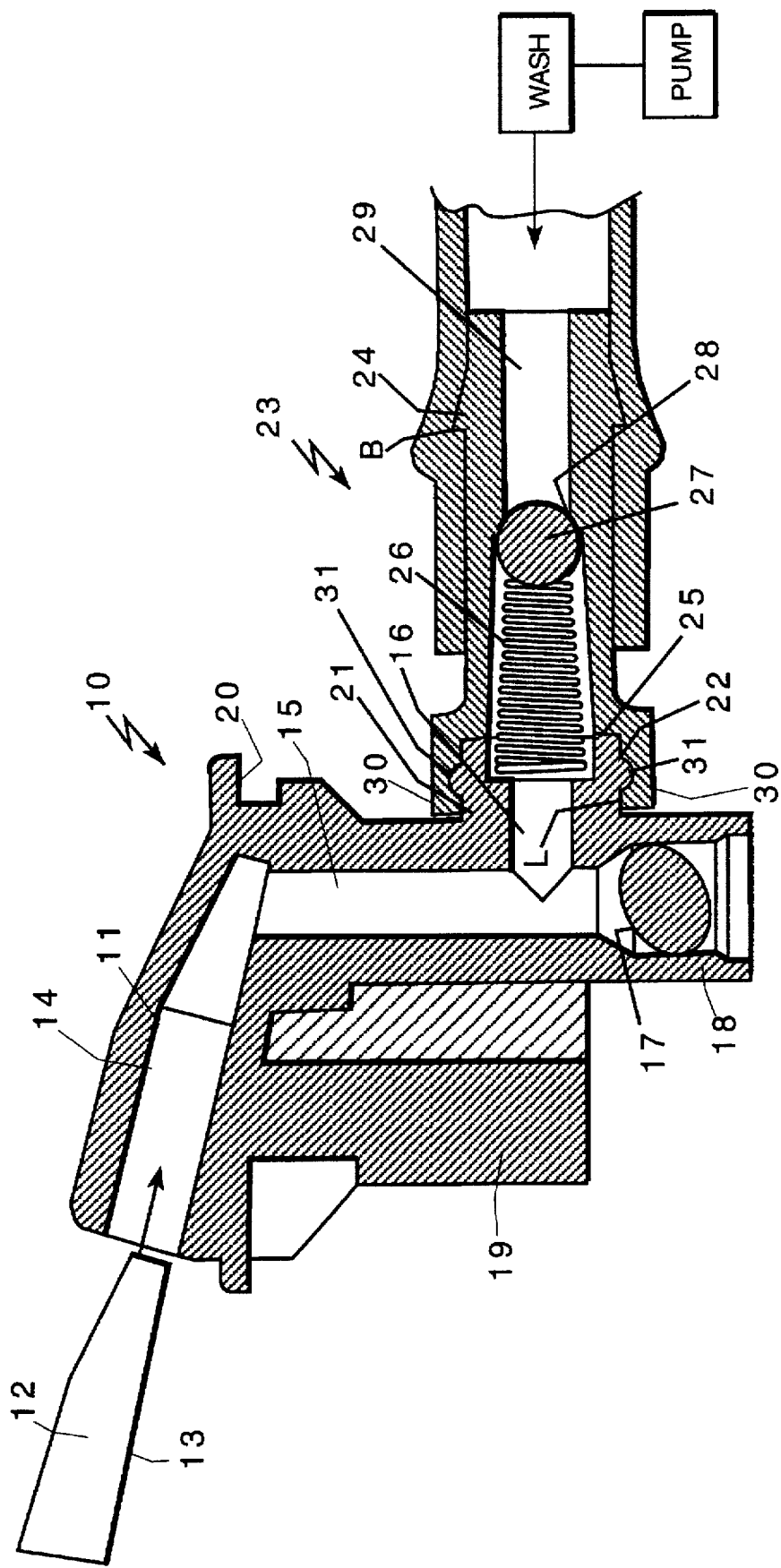
Figure 2:
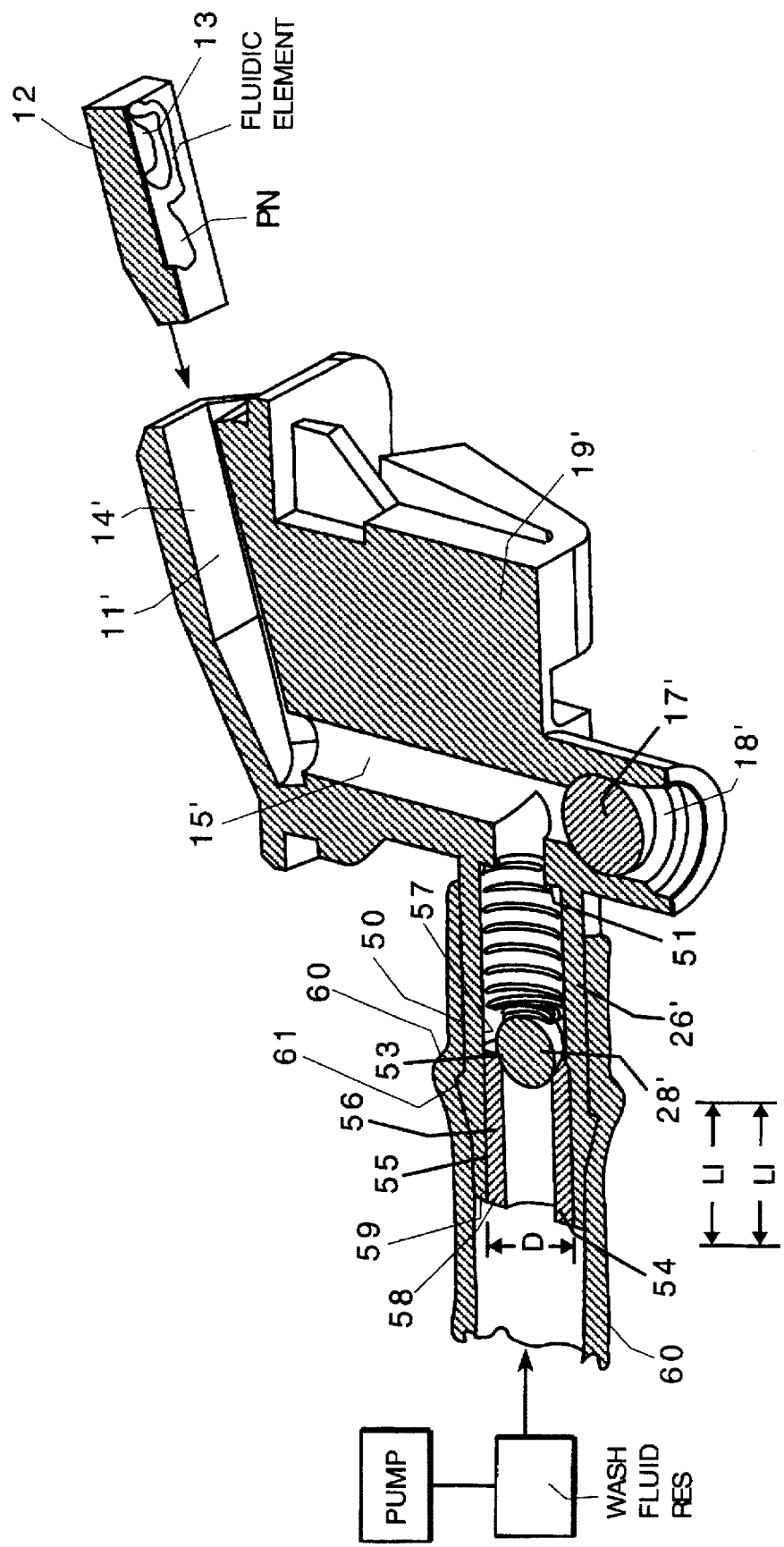
FIG. 2 is a sectional view of a fluidic nozzle incorporating the in-line check valve of the present invention.

The prior art illustrated in FIG. 1 comprises a molded housing 10 having a fluidic oscillator insert chamber 11 adapted to receive a molded silhouette member 12 which has a fluidic oscillator silhouette molded in face 13 and peripheral side and edge surfaces which are adapted to make a sealing engagement with the interior walls 14 of chamber 11. The particular silhouette forming the fluidic oscillator is illustrated in FIG. 2 but, it will be appreciated that any fluidic oscillator silhouette can be used. The fluidic oscillator has a power nozzle PN which is adapted to be aligned with the wash fluid inlet passage 15. Wash fluid inlet passage 15 is coupled to a second wash fluid inlet passage 16. In the embodiment shown, the oscillator chamber 11, inlet passage 15 and inlet passage 16 are made in the molding process by pins which are withdrawn to leave the passages. A ball 17 is forcibly inserted into the enlarged end 18 of wash fluid passage 15 to seal same. (The same configuration is shown in detail in FIG. 2).

The portion 19, 20 are designed to accommodate a particular opening in the hood or other mounting structure of a vehicle for mounting purposes and is not particularly relevant to the present invention.

As shown in FIG. 1, the wash fluid passage 16 is formed in a nipple 21 which has an annular rib 22 molded therein. A check valve assembly 23 is included in a hose nipple 24. The check valve assembly 23 includes an annular shoulder 25 formed on an inward portion of inlet nipple 21 and includes a spring 26 urging ball valve element 27 into a valve seat 28 formed on the interior wall of wash fluid inlet passage 29. Check valve assembly 23 is assembled by placing the spring on the shoulder 25 and fitting the ball 28 into the seat and then forcing the annular connection collar 30 onto the nipple 21 with annular rib 22 seated in annular groove 31.

It will be appreciated that the design of FIG. 1 is, in effect, a two-piece nozzle housing where the two pieces are welded or glued together along the nipple 21 and the connection collar 30. That is, the line "L" where the two parts are joined together can leak and this also requires an extra assembly process. Note that the rubber hose or tube 40 which carries the wash fluid under pressure is slid over the feed nipple 24 and the barb "B" thereon and, thus, does not encompass the seal line "L" where the collar 30 fits over the nipple 21.

THE PRESENT INVENTION

Referring now to FIG. 2, wherein corresponding elements have been primed, it will be noted that in this invention, the wash fluid feed tube 50 has an internal shoulder 51 which is deep within wash fluid input tube 50 for receiving the base of check valve spring 26'. In this embodiment, a ball check valve 28' is urged or biased by spring 26' into engagement with valve seat 53 formed on the downstream end of tubular insert member 54 which has an external surface 55 having a diameter D at least sufficient to form an elongated wash fluid seal 56 with the annular walls 57 defining the wash fluid flow path. The tubular insert 54 can be adjusted in length LI (or its depth of insertion adjusted) to thereby adjust the cracking pressure e.g., the pressure when the valve unseats and wash fluid is allowed to flow to the windshield washer nozzle popper. Thus, by adjusting the length LI of tubular insert 54, the cracking pressure can be adjusted without any other structural change in the assembly. Note that the upstream end 58 of tubular insert 54 is, in the preferred embodiment, flush with the upstream end 59 of input tube 50 but, this is not a necessary criteria.

An important feature of the invention is that the hose or rubber tube 60 is telescoped over the outer end of input tube 54 and is retained in place by barb 61. The rubber hose 60 seals along the external surface and is the only seal that is required thereby eliminating seals such as the seal between the coupling element 30 and nipple 21 of the prior art design shown in FIG. 1.

In the preferred embodiment, spring 26' is a tapered stainless steel spring which is utilized to achieve preload on the ball against the seat valve. The spring preload and sealing diameter of the ball determine the cracking pressure and, as discussed earlier, the spring preload can be adjusted by adjusting the length of tubular insert 54.

Figure 3A:
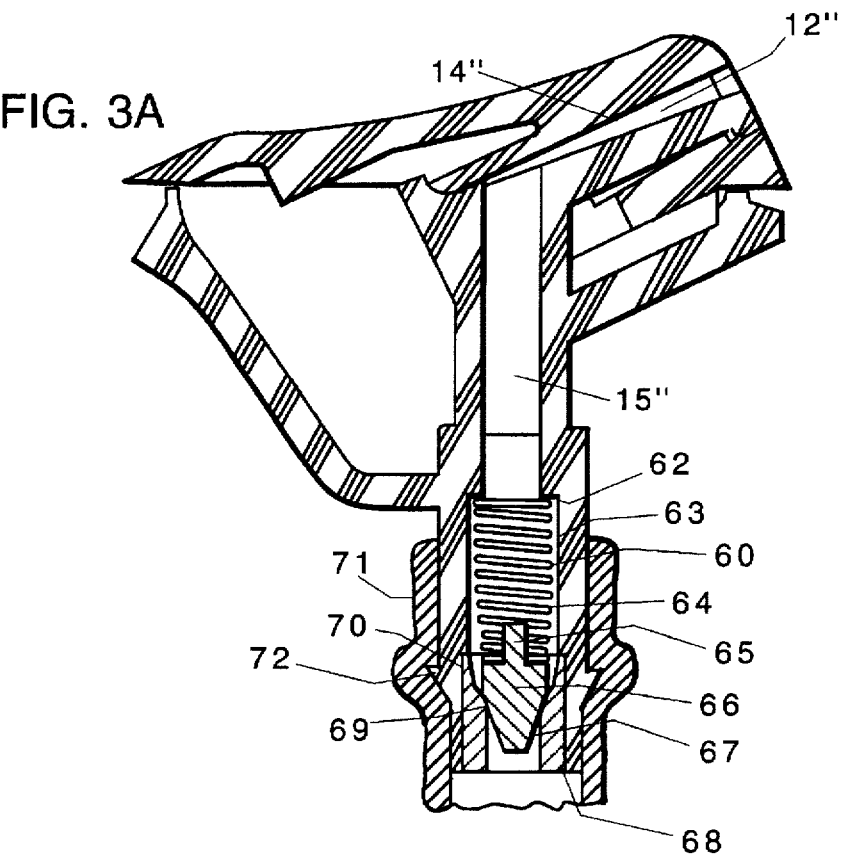
FIG. 3A and 3B are modifications of the invention.
Figure 3B:
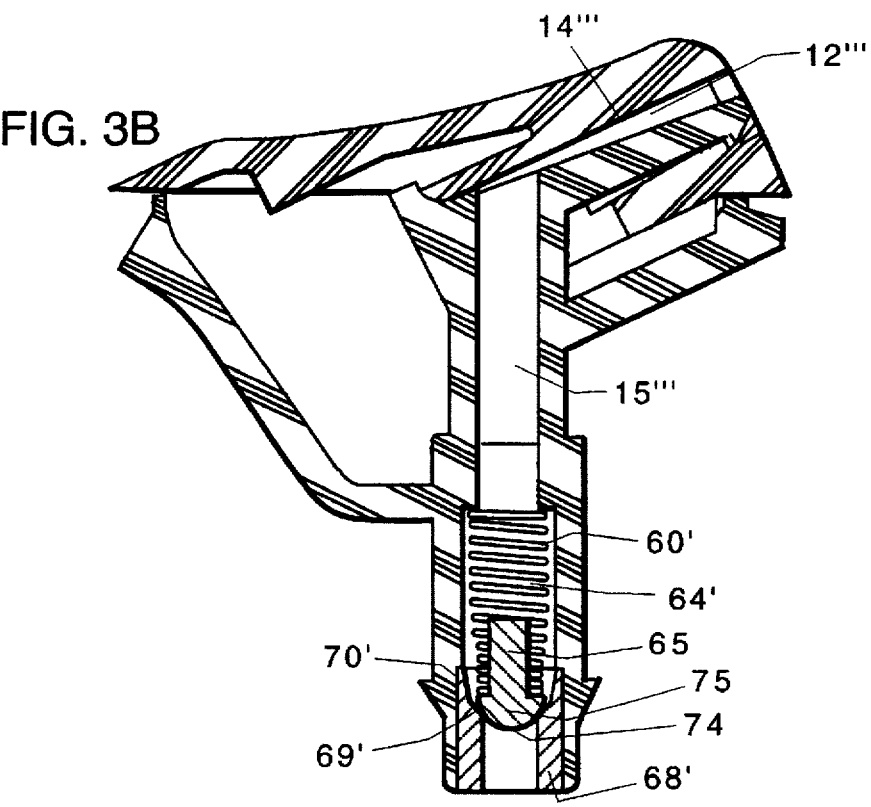

In the embodiments shown in FIGS. 3A and 3B numerals corresponding to those used in FIG. 2 are primed, double primed or triple primed, the wash fluid feed passages 15" and 15'" are extensions of the feed tube 50' and 50" passages, respectively. The external configuration of the nozzle is adapted to a particular vehicle. In FIG. 3A, an annular spring shoulder 62 is formed on wash fluid passage wall 63 and the downstream end of check valve spring 64 bears thereon. The upstream end of spring 64 receives a centering projection 65 of valve element 66 which has a conical head 67. Tubular insert 68 has a valve seat 69 near the downstream end thereof which coacts with the conical surfaces of head 67 to form the actual valve element. The inner surface of the downstream end 70 of insert 68 is conically shaped to guide conical head 67 to proper seating on valve seat 69 during assembly. The flexible hose 71 is telescoped over annular hose retention barb 72. Again, any leakage along the interface between tubular insert 68 and the interior surfaces forming passage 60 is to the flow stream of wash fluid from the wash fluid reservoir.

In the embodiment shown in FIG. 3B, the end 74 of valve element 75 is rounded or mushroom-shaped and the valve seat 69' is shaped complementary thereto.

While the invention has been shown and illustrated in its preferred embodiment and modifications are to have been suggested, it will be clear to those skilled in the art that various other modifications, adaptations and iterations to the invention will be readily apparent to those skilled in the art.

What is claimed is:

1. In a windshield washer system having a nozzle mounted on a vehicle for issuing wash fluid to a windshield and a check valve for a fluid circuit from a supply of wash fluid to said nozzle, said nozzle having a fluid feed tube integrally formed therewith, said feed tube having annular walls defining a washer fluid flow path and a diameter of at least D, said feed tube having an external surface adapted to receive and retain a flexible hose from a supply of wash fluid, the improvement wherein said feed tube has an internally formed spring shoulder, a coil compression spring having upstream and downstream ends with the downstream end bearing on said spring shoulder, a valve element bearing on said upstream end of said spring element, and a tubular insert having an inner end and an external diameter at least D and sufficient to form an elongated wash fluid seal with said annular walls defining a washer fluid flow path, and a valve seat formed on said inner end.

2. The nozzle defined in claim 1 wherein said insert has a length L selected to determine the opening pressure of said check valve.

3. The nozzle defined in claim 1 wherein said valve element and said valve seat are shaped complementary to each other.

4. The nozzle defined in claim 1 wherein said valve element is a spherical ball.

5. The nozzle defined in claim 4 wherein said valve element has a conical external surface and a centering projection on a downstream end thereof.

6. The nozzle defined in claim 4 wherein said valve element has a rounded mushroom shape external surface and a centering projection on a downstream end thereof.

* * * * *